United States Patent [19]

Köppl et al.

[11] Patent Number: 4,539,432
[45] Date of Patent: Sep. 3, 1985

[54] COOLABLE ELECTRICAL COMPONENT

[75] Inventors: Georg Köppl, Birr; Gerhard Linhofer, Baden, both of Switzerland

[73] Assignee: BBC Brown, Boveri & Company Limited, Switzerland

[21] Appl. No.: 573,520

[22] Filed: Jan. 25, 1984

[30] Foreign Application Priority Data

Jan. 27, 1983 [EP] European Pat. Off. ........ 83200151.5

[51] Int. Cl.³ .............................................. H01B 7/34
[52] U.S. Cl. ................................ 174/15 C; 174/15 R; 174/16 R; 174/16 B
[58] Field of Search ................ 174/15 R, 15 C, 16 R, 174/16 B

[56] References Cited

U.S. PATENT DOCUMENTS 3,609,206  9/1971  McConnell ................ 174/15 C
4,105,859  8/1978  Cookson et al. .......... 174/16 B X
4,378,461  3/1983  Haginomori ............... 174/15 C X

FOREIGN PATENT DOCUMENTS 57-199213  12/1982  Japan ...................... 174/15 R Primary Examiner—A. T. Grimley
Assistant Examiner—Morris H. Nimmo
Attorney, Agent, or Firm—Ostrolenk, Faber, Gerb & Soffen

[57] ABSTRACT

A coolable electrical component having a housing (1) filled with insulating gas, and a conductor (2) of hollow cylindrical construction causing a high voltage, arranged in this housing (1). Through the interior space (7) of the conductor a coolant is circulated. The electrical component occupies a smaller space and yet allows increased current load capacity. This is achieved by providing a high-pressure tank (19) extending in the longitudinal direction of the conductor (2) in the interior space (7) thereof. The tank is connected to a gas liquefaction installation by means of outlet orifices (18) perforated in its wall at regular intervals thereof.

Such a componet may preferably be a tubular gas cable or a component of a gas-insulated, metal-encapsulated switchgear.

10 Claims, 1 Drawing Figure

U.S. Patent   Sep. 3, 1985   4,539,432
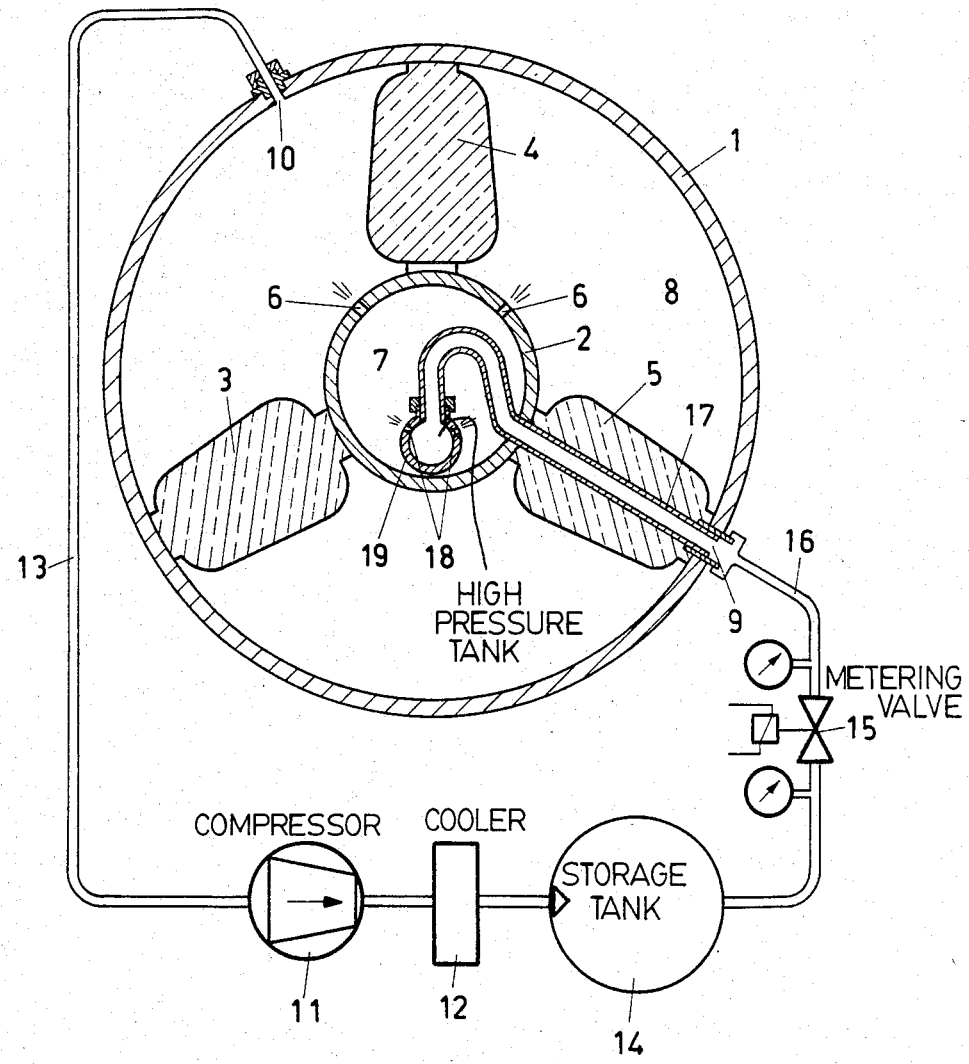

COOLABLE ELECTRICAL COMPONENT

BACKGROUND OF THE INVENTION

This invention relates to a coolable electrical component and, more particularly, to a high voltage electrical transmission system which is provided with a cooling apparatus.

A cooled transmission system of this type is described, for example, in European Patent Application No. 0,048,126. The transmission system or the electrical bus, as it is also known, described therein is a tubular gas cable which has a grounded housing and which is filled with an insulating gas. A conductor of hollow cylindrical construction carrying a high tension voltage is arranged within the housing and is insulated therefrom by means of insulating spacers. The conductor is provided with passage orifices which allow insulating gas present in its interior and in the annular chamber space between housing and the conductor to pass therethrough. At least one gas outlet orifice through which heated insulating gas is passed out of the interior of the conductor and through an insulator cylinder into a cooling apparatus is located outside the housing. Cooled gas is passed through a channel annularly surrounding the insulator cylinder into the annular chamber, where, in order to cool the conductor, it is passed first to the external surface of the conductor and then, after passing through the passage orifices, along its internal surface to the outlet orifice.

Although it is possible with this tubular gas cable to increase the current load capacity of the electrical bus by up to 60%, in comparison to an uncooled cable of the same size, nevertheless due to the comparatively inefficient cooling action of the insulating gas, which operates by convection current only, it is necessary to provide numerous cooling apparatuses at closely spaced intervals of the cable. Additionally, the internal surface of the conductor must be enlarged, for example by milling surface grooves therein. These measures are quite burdensome and further create an undesirably large structure requiring more space.

SUMMARY OF THE INVENTION

Accordingly, it is an object of the invention to provide a cooled electrical component or electrical transmission system which is smaller and yet capable of carrying an increased current load.

This object is achieved by the cooled transmission line in accordance with the present invention which includes a cooling system in which liquified gas is evaporated to remove heat from the conductor and then liquified to be used again. Very efficient cooling is thus provided, and hence an extremely high current load capacity conductor can therefore be obtained with a small supply of coolant. A gas cooling or gas liquefaction installation can be erected remotely from the housing, to allow a considerable reduction in the volume occupied by the housing. Furthermore, it is possible to re-equip already existing electrical components with only small additional expenditure of resources.

When the apparatus according to the present invention is near the housing and includes an orifice for receiving gas from the space between the housing and the conductor, the cooling effect is further improved because evaporated insulating gas also removes heat from the outside surface of the high voltage conductor. Where the apparatus according to the invention further includes a gas of a high cooling efficiency, its selection can be effected irrespective of its insulating properties. If the apparatus includes a metering valve, its cooling capacity can be adapted in an easy manner to different current loadings.

An additional advantage of the apparatus according to the invention is that the conductor is cooled particularly uniformly in the longitudinal direction, because the coolant flow can be distributed uniformly along the length of the pipe.

According to a further embodiment of the invention, a high-pressure tank, constructed as a tube or hose, can be easily added to the apparatus. This is advantageous particularly if the high voltage conductor exhibits changes of direction. Subsequent retrofitting of a cooling apparatus to a component is also easily accomplished according to the invention.

In order to explain the invention more fully, an exemplary embodiment is described below with reference to the drawing.

BRIEF DESCRIPTION OF THE DRAWING

The FIGURE shows a section at a right angle to the tube axis through a component according to the invention constructed as a tubular gas cable.

DETAILED DESCRIPTION

In the FIGURE, a housing 1, of substantially hollow cylindrical construction and comprising a tubular gas cable is shown. The housing 1 may consist of metal, such as aluminium or steel may be grounded. On the other hand, and it may also consist of an insulating material, such as plastic for example. In the interior 8 of the cylindrical housing 1, a conductor 2 for carrying a high voltage is likewise of hollow cylindrical construction and is braced coaxially in the housing 1 on three insulators 3, 4 and 5. Although only insulators 3, 4 and 5 are illustrated in the FIGURE, other supporting insulators, not shown in the FIGURE, such as disc-shaped or funnel-shaped bulkhead insulators, could be used. Such support insulators are provided at prescribed intervals along the tube axis of the tubular gas cable. Some of the insulators function not only as supports for the conductor 2 in the housing 1, but also as fittings which divide the tubular gas cable into gas-tight compartments which are arranged along the longitudinal axis of the cable. These compartments, each of which is bounded by two bulkhead insulators and by the housing 1, are filled with an insulating gas, such as, for example sulphur hexafluoride.

Housing 1 and conductor 2 include orifices or openings through which cooling fluid can circulate. The orifices 6 of the conductor 2 connect the conductor interior space 7 to an annular chamber 8 located between conductor 2 and housing 1, so that insulating gas can flow between these spaces. Liquefied insulating gas is introduced through an inlet orifice 9 of the housing 1 into a bulkhead compartment whereas insulating gas is removed from the bulkhead compartment through an outlet orifice 10.

A gas liquefaction installation comprising a compressor 11 and a cooler 12 is provided outside the housing 1. The inlet of the gas liquefaction installation is connected to the annular chamber 8 by a pipe 13 terminating at the outlet orifice 10. The outlet of the gas liquefaction installation on the other hand is connected to a storage tank 14, and through a metering valve 15 and a pipe 16 to the inlet orifice 9. A pipe 17 made of insulating material, and a high-pressure tank or vessel 19 having outlet orifices 18 and extending in the longitudinal direction of the conductor 2 is arranged within the interior space 7 of the conductor 2.

The pipe 17 includes an insulator part which passes the annular chamber 8 and which insulates the high voltage conductor 2 from the housing 1. The insulator part may be the insulator 5 itself in which a bore is provided and which provides a sealed passageway between the inlet orifice 9 and the interior space 7. On the other hand, as shown in the FIGURE, the insulating part can be part of the pipe 17 which passes through a bore in the insulator 5. The pipe 17 may be of rigid (tube) or flexible (hose) construction.

The high-pressure tank 19 may also be constructed as a tube or hose. Its outlet orifices 18, fractions of a millimeter wide, are preferably perforated in the wall of the tube or hose at regular intervals thereof. If the high-pressure tank 19 is constructed as a tube, then it may preferably consist of metal. A metal tube has the advantage of good thermal distribution along its tube axis and high mechanical strength. If the high-pressure tank 19 is constructed, it should consist of a cold-resistant plastic comprised of silicone plastics, or of metal. Such a high-pressure tank exhibits only small heat losses and may therefore have a comparatively small diameter.

The function of the above-described apparatus is as follows:

Insulating gas which has absorbed heat from the conductor 2 flows out from the annular chamber 8 through the outlet orifice 10 is sucked through the pipe 13 into the gas liquefaction installation. The insulation gas is compressed in a compressor 11 and the compressed gas is liquefied in the cooler 12 downstream located remotely to the compressor 11. The liquefied insulating gas is pumped into the storage tank 14 which is provided with a one way valve, not shown, and in which, by being subject to the effects of external temperature, the gas is heated and develops a high pressure (approximately 40 bar at 20° C. ambient temperature when sulphur hexafluoride is the insulating gas). The high pressure prevailing in the storage tank 14 drives the pressurized liquefied insulating gas through the metering valve 15 and then through the pipes 16 and 17 into the high-pressure tank 19. The gas flows through the outlet orifices 18 into the interior space 7 at which point the gas pressure drops to only approximately 4 bar. The liquefied insulating gas then evaporates and removes heat from the interior space 7 and connector 2 space 7 to remove more heat from the interior space 7. The cool insulating gas becomes warm and flows, due to the slight excess pressure in the interior space 7, through the orifices 6 into the annular chamber 8, from where it passes through the outlet orifice 10 and the pipe 13 back to the gas liquefication installation. A particularly favorable utilization of the cooling effect is achieved if the orifices 6 are located at the end faces of the compartments near the region of the bulkhead insulators, and if the outlet orifice 10 is located at approximately midway between both ends of the compartment. Then the cool insulating gas flows along the entire internal and external surfaces of the conductor 2 and thus develops a more uniform and efficient cooling action is obtained.

The invention is obviously not limited only to tubular gas cables as components, but rather relates to all electrical components having a housing in which a conductor at high tension voltage is provided, such as power switches and isolating switches of gas-insulated metal-encapsulated switchgear. Furthermore, it is not necessary for the gas liquefaction installation to liquefy only insulating gas. It is also possible for the inlet of the gas liquefaction installation to communicate with the interior space 7 of the conductor 2 and to provide a gas-tight conduit between the orifices 6 and the outlet 10. With the above arrangement, a gas other than that provided in the annular chamber 8 may be used for a coolant. For example, sulphur hexafluoride can be used as an insulation gas in the annular chamber 8 and liquefied nitrogen can be used for cooling purposes in the interior space 7.

I claim:

1. Coolable electrical component, comprising:
    an elongated, hollow conductor having an inner space and at least one orifice therethrough to allow said inner space to communicate outside said hollow conductor;
    an outer housing surrounding and radially spaced from said hollow conductor and insulated therefrom, said outer housing defining an annular chamber between said outer housing and said hollow conductor and including an inlet opening and an outlet opening;
    a high pressure vessel disposed within said hollow conductor, said high pressure vessel including an interior space within said vessel, an insulating fluid in said interior space of said vessel, means for connecting said interior space to said inlet opening of said outer housing, and at least one expansion nozzle in said high pressure vessel to allow said insulating fluid in said interior space of said vessel to communicate with and expand into said inner space of said conductor;
    means for presssurizing and cooling said insulating fluid and for circulating said fluid through said inlet opening of said outer housing through said means for connecting said interior space to said inlet opening of said outer housing through the expansion nozzle to said inner space of said conductor through the said at least one orifice into said annular chamber and out of said housing through said outlet opening; and
    metering means coupled to said inlet opening for controlling the rate at which said insulating fluid flows through said inlet opening.

2. The component of claim 1, wherein said vessel is an elongated vessel extending along the longitudinal direction of said conductor, and wherein said pressurizing and cooling means comprises: a compressor in communication with said outlet opening for drawing said insulating fluid out of said annular chamber and for cooling said insulating fluid, a storage tank for receiving said insulating fluid from said compressor, said storage tank being connected to said metering means.

3. The component of claim 2, wherein said insulating fluid is sulphur hexafluoride (SF6) and wherein said compressor is adapted to liquefy said insulating fluid so that said fluid is in liquid form when it enters said inlet opening.

4. The component of claim 2, wherein said storage tank comprises a one-way flow valve to receive said insulating fluid from said compressor and means for increasing the temperature of said insulating fluid to increase the pressure thereof.

5. The component of claim 2, wherein said means for connecting said interior space of said high pressure vessel to said inlet opening comprises, at least over a portion thereof, a hollow insulated tubular section to electrically insulate said outer housing from said conductor.

6. The component of claim 2, wherein said high pressure vessel comprises a metal hose.

7. The component of claim 2, wherein said high pressure vessel forms a hose comprised of a cold-resistant plastic including silicon resins.

8. The component of claim 6, wherein said at least one orifice in said high pressure vessel comprises a plurality of spaced orifices provided along the longitudinal direction of said vessel.

9. The component of claim 7, wherein said at least one orifice in said high pressure vessel comprises a plurality of spaced orifices provided along the longitudinal direction of said vessel.

10. The component of claim 2, wherein said elongated hollow conductor includes a first end and a longitudinally opposite second end, said at least one orifice of said conductor being located in the vicinity of said first and second ends, and wherein said outlet opening in said housing projects to a point on said conductor located generally midway between said orifices of said conductor.

* * * * *